United States Patent [19]
Aaronson

[11] Patent Number: 5,264,233
[45] Date of Patent: Nov. 23, 1993

[54] METHOD FOR BEATING EGGS

[76] Inventor: Ruth P. Aaronson, 3 Gedalia Street, Bakaa, 93555, Jerusalem, Israel

[21] Appl. No.: 645,546

[22] Filed: Jan. 24, 1991

[30] Foreign Application Priority Data

Jan. 30, 1990 [IL] Israel .......................................... 93211

[51] Int. Cl.$^5$ .............................................. A23J 3/00
[52] U.S. Cl. .................................... 426/519; 426/568
[58] Field of Search ............ 426/519, 564, 568, 330.1

[56] References Cited

U.S. PATENT DOCUMENTS 2,237,827  4/1941  Fischer .................................. 426/519
3,201,257  8/1965  Hamon .................................. 426/568

Primary Examiner—George Yeung
Attorney, Agent, or Firm—David M. Warren

[57] ABSTRACT

A method for whipping egg white employs a food processor having a rotary blade for spinning the egg white, the method providing for a rotating of the blade at a rotational speed in a range of 350 to 999 revolutions per minute, preferably at 700 R.P.M.

3 Claims, No Drawings

METHOD FOR BEATING EGGS

The present invention relates to a method for whipping egg whites by means of a food processor which includes a knife or any other part capable of spinning the egg white wherein said method is characterized by a rotational speed between 350-999 R.P.M.

The whipping of egg whites by mechanical or electrical means by mixing and rotating the egg whites is well known. The whipping of egg whites by means of currently existing food processors is unsatisfactory and produces an insufficient quantity of foam. Almost all food processors use synchronous motors. In countries in which the electric alternates at 50 Hz the rotational speed of the food processor is 1500 R.P.M. In countries in which the electric current alternates at 60 Hz the rotational speed is 1800 R.P.M.

There is also a food processor in which the motor is not synchronous (made by Hamilton Beach) in which there are either 2 or 6 rotation speeds. In all cases the highest speed is 1800 R.P.M. and the lowest—1400 R.P.M. In addition, the motor of the REGAI food processor is not synchronous and rotates at 1800 R.P.M. The manufacturer does not offer any slower speed.

With regard to whipping, the rotation speeds in food processors have not been observed to be effective at less than 1000 R.P.M. For example, the U.S. Pat. No. 4,199,268 specifically relates to rotation speeds greater than 1000 R.P.M.

Generally, with respect to the mixing of food products in the home, there are different forms of mixing apparatus commonly employed in the kitchen. Each has a specific characteristic and function. For example, one form of mixing apparatus employs a large bowl shaped container and a mixing implement in the form of a hook for mixing dough preparatory to baking bread. Another form of mixing apparatus employs a smaller bowl and a pair of counter-rotating beaters, each of which has the form of a set of parallel blades disposed parallel to an axis of rotation, for beating and aerating batter preparatory to baking a cake. The type of mixing apparatus of interest herein for the practice of the invention is known as a food processor. The food processor is constructed as described hereinabove and, furthermore, has a container, normally, in the form of a right circular cylinder and a rotating blade assembly within the container. For blending liquid matter, the blade assembly is constructed of a rotatable stem extending along a central axis of the container. Furthermore, in the usual construction of the blade assembly, two cutting blades extend radially outward from the stem toward the container wall, there being a clearance between the container wall and tips of the blades to permit rotation of the blades about the central axis. The two blades are located, normally at different distances from the bottom of the container, for example, approximately one quarter of an inch and approximately three quarters of an inch. The usual container has a diameter of approximately six inches and a height, along the central axis, of approximately five inches. The container is normally covered to enclose the food matter being processed. Due to the poor performance in the beating of eggs, it has been the practice of manufacturers of food processors to provide, at additional cost and mechanical complexity, some other form of blade assembly which can generate a sufficient amount of foam in the processing of egg whites.

In examining the quantity of foam produced at various rotational speeds we found to our surprise that when the rotational speed was approximately 700 R.P.M., the amount of foam produced in whipping the egg whites was far greater than that produced by the standard rotational speed of 1400 or 1800 R.P.M. At rotational speed between 350-999 R.P.M., and especially between 600-800 R.P.M., the quantity of foam was greater than that produced at standard speed.

According to the present invention, the knife or blade can be the standard flat knife or blade of a food processor, but also a knife of any type or shape capable of rotating the egg whites.

EXAMPLE A 100 cc of liquid egg whites were blended in a food processor with a standard cutter for one minute and at 1800 R.P.M. The result was 250-300 cc of foam.

EXAMPLE B 100 cc of liquid egg whites were blended in a food processor with a standard blade for 3¾ minutes, with its rotational speed adjusted to 700 R.P.M. This resulted in 600-800 cc of foam. In addition, under the same conditions at rotational speed between 350-999 R.P.M., over 300 of foam were produced.

I claim:

1. A method for whipping egg white within a food processor, the food processor comprising blade means having a a plurality of flat blades configured as the knives of a food processor, each of said blades extending radially outward of an axis of rotation of the blade means, the blade means being capable of spinning the egg white, said method comprising a step of increasing an amount of foam of whipped egg white from an amount of foam produced at a blade rotational speed of 1400 R.P.M. by rotating said plurality of blades at a rotational speed in a range of 350-999 R.P.M.

2. A method according to claim 1 wherein the rotational speed is between 600-800 R.P.M.

3. A method according to claim 1 wherein the rotational speed is 700 R.P.M.

* * * * *